US008396740B1

(12) United States Patent  (10) Patent No.: US 8,396,740 B1
Watson  (45) Date of Patent: Mar. 12, 2013

(54) METHOD FOR MONITORING AND DISPLAYING OF UTILITY CONSUMPTION

(75) Inventor: Robert D. Watson, Dallas, TX (US)

(73) Assignee: NOI Engineering PLLC, Dallas, TX (US)

( * ) Notice: Subject to any disclaimer, the term of this patent is extended or adjusted under 35 U.S.C. 154(b) by 264 days.

(21) Appl. No.: 12/915,684

(22) Filed: Oct. 29, 2010

(51) Int. Cl.
  G06Q 10/00 (2012.01)
  G06F 17/00 (2006.01)
(52) U.S. Cl. ...................... 705/7.39; 705/412
(58) Field of Classification Search .......... 715/700–866; 700/83, 17; 340/870.01, 870.02; 707/999.104, 707/999.107; 705/412, 30, 34, 1.1, 7.11, 705/7.38, 7.39, 29, 413; 702/60, 61
See application file for complete search history.

(56) References Cited

U.S. PATENT DOCUMENTS

| 4,077,061 | A | | 2/1978 | Johnston et al. |
| 4,110,825 | A | | 8/1978 | Fox et al. |
| 4,153,936 | A | | 5/1979 | Schmitz et al. |
| 5,581,684 | A | * | 12/1996 | Dudzik et al. ................ 715/708 |
| 5,930,773 | A | * | 7/1999 | Crooks et al. ................ 705/30 |
| 6,122,603 | A | | 9/2000 | Budike, Jr. |
| 6,904,385 | B1 | | 6/2005 | Budike, Jr. |
| 7,222,111 | B1 | | 5/2007 | Budike, Jr. |
| 7,519,485 | B2 | | 4/2009 | MacGregor |
| 7,788,189 | B2 | | 8/2010 | Budike, Jr. |
| 2007/0143046 | A1 | * | 6/2007 | Budike ........................... 702/62 |
| 2009/0125825 | A1 | | 5/2009 | Rye et al. |
| 2009/0281677 | A1 | | 11/2009 | Botich et al. |
| 2009/0289809 | A1 | | 11/2009 | Gray et al. |
| 2010/0060479 | A1 | * | 3/2010 | Salter ......................... 340/870.4 |
| 2010/0064001 | A1 | * | 3/2010 | Daily ............................ 709/203 |
| 2010/0110932 | A1 | * | 5/2010 | Doran et al. .................. 370/254 |
| 2010/0145629 | A1 | | 6/2010 | Botich et al. |
| 2010/0286937 | A1 | * | 11/2010 | Hedley et al. .................. 702/60 |
| 2011/0025519 | A1 | * | 2/2011 | Donaldson et al. ........... 340/664 |

FOREIGN PATENT DOCUMENTS

JP 2004245611 * 9/2004
JP 2010271915 * 5/2009

* cited by examiner

Primary Examiner — Igor Borissov
(74) Attorney, Agent, or Firm — Mark W Handley

(57) ABSTRACT

A method is disclosed for displaying utility consumption of a property portfolio for zones of a display area. First values correspond to utility consumption and second values corresponding to consumption intensity are first determined. The first values for each zone are ranked from high to low values and associated with a size of a geometric form corresponding to each of the zones. Similarly, the second values for each zone are ranked from high to low values and associated with a corresponding color, with a highest of the second values having a first color representing a highest consumption intensity, the smallest of the second values having a second color representing the lowest consumption intensity, and the remaining of the second values are associated with mixtures of the first color and second color. The respective geometric forms for each of the zones are displayed on the map at respective spatial locations.

24 Claims, 10 Drawing Sheets

METHOD FOR MONITORING AND DISPLAYING OF UTILITY CONSUMPTION

TECHNICAL FIELD OF THE INVENTION

The present invention relates in general to displaying utility consumption data for realty property, and in particular to graphic display of relative utility consumption for realty property portfolios.

BACKGROUND OF THE INVENTION

Various methods have been provided for presenting utility consumption for a collection of properties in a real estate portfolio. One common method is to list numeric values of consumption in tabular form, such as in a spread sheet. However, a tabular form requires review and comparison of listed numbers in a column, and interpolation to make a determination of which properties would benefit most from review and auditing of utility consumption. Although satisfactory for small real estate portfolios, this method is cumbersome for review for real estate portfolios having a large number of properties. A simple virtual display of utility consumption and energy consumption intensity is desired to more easily identify properties which could most benefit from review and auditing of utility consumption, capital improvements, and other efforts to reduce utility consumption.

SUMMARY OF THE INVENTION

A novel method for monitoring and displaying utility consumption of a property portfolio is disclosed. A display area, temporal period, and display zones are selected. The display zones are the minimum size locale for which aggregate consumption values are shown within the display area. Then, values for total utility consumption and consumption intensities are calculated for each zone in the property portfolio. First values representing total aggregate utility consumption are calculated for each of the zones and second values representing consumption intensity are calculated for each of the zones. The first values for each zone are ranked from high to low values and associated with sizes of respective geometric forms corresponding to each of the zones, with a highest of the first values being associated with a largest size of the geometric forms and the smallest of the first values being associated with the smallest size of the geometric forms. The remaining of the first values are associated with sizes of geometric forms, from high to low, corresponding to associated total utility consumption rankings for each of the respective zones. Similarly, the second values for each zone are ranked from high to low values and associated with a corresponding color for the respective ones of the geometric forms representing each of the zones, wherein a highest of the second values has a first color representing a highest consumption intensity, and the smallest of the second values has a second color representing the lowest consumption intensity. The remaining of the second values for consumption intensity are associated with mixtures of the first color and the second color to define color shades there-between corresponding to an associated consumption intensity ranking. The respective geometric form for each of the zones are displayed on a map of the display area, with each of the geometric forms having the associated size determined from the ranking of corresponding first values for each of the zones and the color corresponding to respective second values for each of the zones, and wherein the geometric forms corresponding to each of the zones are shown disposed at respective spatial locations on the map.

The sizes of the geometric forms corresponding to the first values for each of the zones are preferably determined by a first scaling according to numeric values for total consumption being represented by an area, but in other embodiments a linear scaling, an exponential scaling, or logarithmic scaling may be used. Similarly, association of the second values with the first color and the second color is preferably determined by a second linear scaling according to numeric values for the consumption intensity, but in other embodiments a second exponential scaling, or logarithmic scaling, may instead be used. Preferably the geometric form for each zone is a circle, which represents a radar sweep on a geographic map, and the displayed areas of the circles are sizes representing the first values for total energy consumption for each zone. The colors for providing fill shading for the circles are preferably red and green, with red representing the highest utility consumption intensity and green representing the lowest utility consumption intensity. The circles are partitioned into sectors which graphically represent respective ones of types of utility components for the total utility consumption of each of the zones. The relative sizes of the sectors for each of the zones is determined by relative consumption values for respective utility consumption. The relative consumption values of respective utility consumption sectors are preferably determined according to either the numeric quantity of energy consumed or the total costs for the utilities consumed. Virtually pointing to one of the sectors provides a tabular display listing particulars of the utility consumption represented by the one of the sectors.

The zones preferably correspond to one of: regional geographic locations, local geographic locations, townships, contiguous properties in a selected locale, buildings in a selected property, and portions of a selected building. The display area preferably corresponds to one of: a continent, a nation, a regional geographic location, a local geographic location, a township, a selected locale, a contiguous property, buildings in a selected property, and a building. The display area may be zoomed from displaying a full view of the display area, to a selected portion of the display area, and to a selected one of the zones, wherein when zoomed to the selected one of the zones the properties comprising the selected one of the zones are displayed as newly defined zones. A full view of the display area may be viewed simultaneously with the selected portion of the display area and with the selected zone. Selected types of utility consumption may be filtered to display only at least one selected utility. Slider controls are displayed for use to change relative values for the utility consumption and the energy intensity in the display area, such that the sizes and the colors for the geometric forms are adjusted to display the effect of the changes to consumption and utility rates. A histogram function slider also displays consumption for selected time periods.

DESCRIPTION OF THE DRAWINGS

For a more complete understanding of the present invention and the advantages thereof, reference is now made to the following description taken in conjunction with the accompanying Drawings in which

FIG. 1 is a screen shot illustrating the method for monitoring and displaying utility consumption for a national real estate property portfolio according to the present invention;

FIG. 2 is a screen shot representing utility consumption of local properties within a single region of the national real estate property portfolio of FIG. 1;

FIG. 3 is a screen shot showing three properties in three local regions for comparison in a single screen;

FIG. 4 is a screen shot illustrating a combined tabular and graphic display of utility consumption for a portfolio;

FIG. 5 is a screen shot illustrating graphically displaying the national real estate property portfolio with application of a change in a slider parameter, such as the histogram slider displaying usage over different time periods;

FIG. 6 is a graph representing various sizes of "radar sweep" profiles according to maximum usage;

FIG. 7 is a flow chart showing a process for monitoring and displaying utility consumption according to the present invention;

FIG. 8 is a flow chart showing the process for monitoring and displaying utility consumption as displayed in FIGS. 1-3, and 5;

FIG. 9 is a flow chart showing the process for monitoring and displaying utility consumption as displayed in FIG. 10.

DETAILED DESCRIPTION OF THE INVENTION

Figure 1:
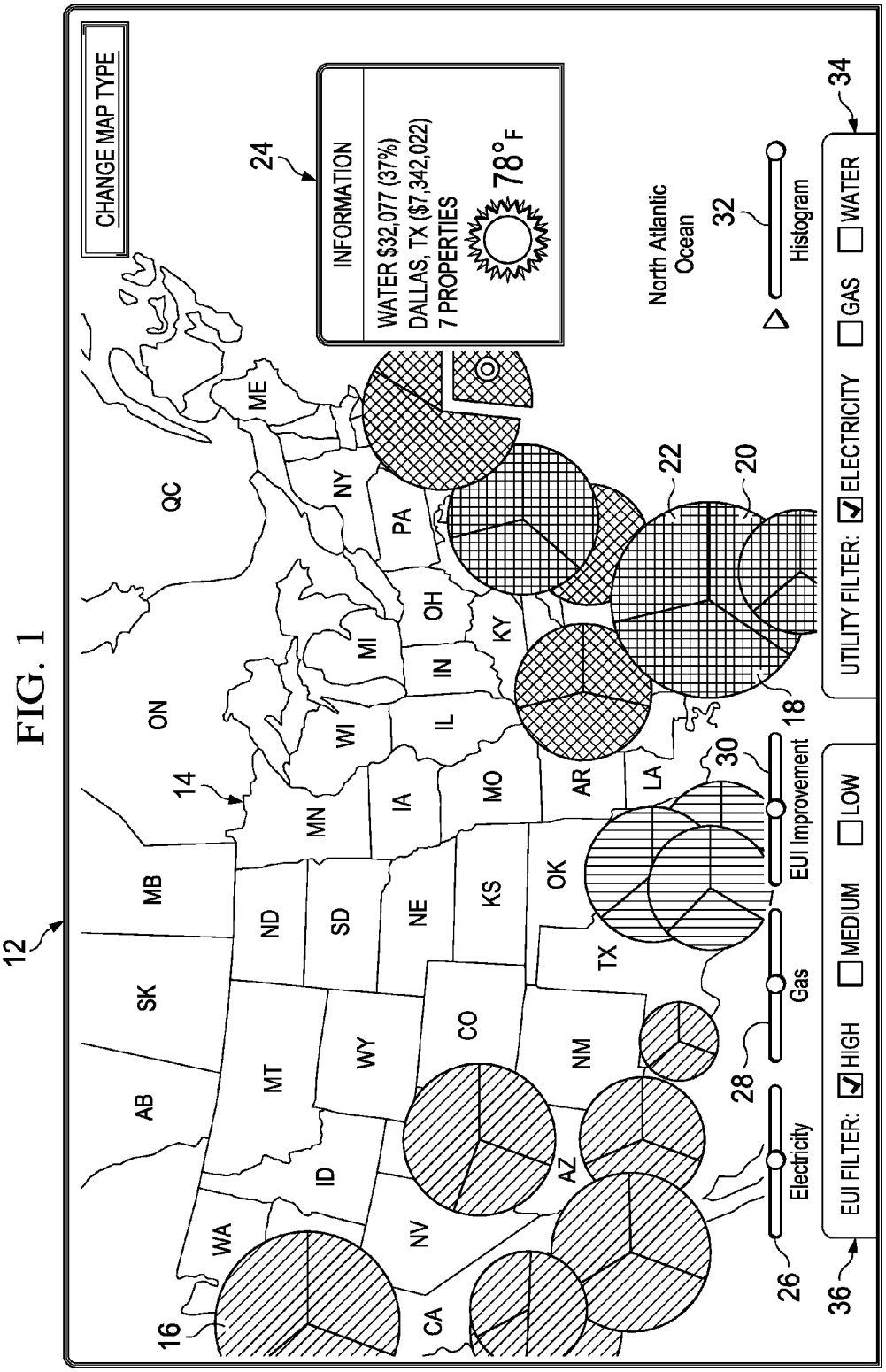
FIGS. 1 through 9 show various aspects for a method for monitoring and displaying utility consumption according to the present invention, as set forth below.

Referring to the Figures, FIG. 1 is a screen shot 12 illustrating a regional view for a national real estate property portfolio according to the method for monitoring and displaying utility consumption of the present invention. The display method is generally intended for owners of multiple properties located in various geographic regions and allows such owners to view a graphic display showing relative utility consumption of various regions in terms of both total utility consumption and relative use intensity. The relative use intensity provides an indication of the efficiency of utility usage for properties in a particular region. In general, total consumption is displayed in terms of either total combined usage for electricity, gas and water for a region over a selected period of time, such as a twelve month rolling average. The total consumption may be expressed in terms of total costs. If total consumption in terms of costs is being viewed, then the efficiency may be expressed as a cost intensity which includes a component for water usage, instead of only electricity and gas for energy usage. Energy usage may also include energy costs for generating chilled water, hot water, and steam, if used. If only energy is being reviewed, such as only electricity and gas usage, then the total consumption may be expressed in terms of energy, such as BTU's or kwh. For such display, the consumption intensity may be displayed to provide an indication of energy use efficiency, rather than including water, and expressed in terms of either Energy Use Intensity ("EUI") or Energy Cost Intensity ("ECI."). EUI and ECI are both well known in the relevant art, being standard industry terms used to express energy usage efficiency.

In practicing the method of the present invention, a display area 14, a temporal period for displaying consumption values, and display zone range is first selected. The display area 14 may be the United States, a local real estate market, or a local property having several consumption components. Display zone range is selected to provide for the general size of zones as the basic unit for graphic display over a selected display area 14. The consumption for each component within a display zone are aggregated to provide a total consumption for the display zone. A geometric form 16 is selected to represent a zone, with a size of the geometric form 16 representing total consumption. Preferably a circle is used as the geometric form 16 and the size representing consumption is the area of the circle. In other embodiments, other geometric forms may be used, such as a rectangle, a cube, a triangle, a cone, a cylinder, and columns of various shapes. In the present embodiment a circle provides the geometric form 16 representing a zone may be referred to herein as a "radar sweep" area. The size of the area of the geometric form 16, or circle, representing each zone is correlated relative to the total aggregate consumption as compared to total consumption for the other zones being displayed, with the largest zone having the largest display area and the smallest zone using the smallest display area. This is discussed in more detail below in reference to FIG. 6.

Consumption intensity is displayed as a fill color for each circle 16 representing a zone, and is preferably linearly scaled such that the zone of the least consumption intensity is colored green, and the zone of largest consumption intensity is colored dark red. The other zones are shaded between green and red depending on the value for consumption intensity relative to smallest and largest consumption zones. The color of a geometric form 16, or circle representing a radar sweep, is based on the sum of consumption, such as total use or amount of currency spent. In some embodiments, consumption intensity may be in terms of standard industry defined terms, such as Energy Usage Intensity ("EUI") or Energy Cost Intensity ("ECI") to take into account the physical size of property in a zone. In such cases, only utilities which may be converted to equivalent energy units are preferably displayed, such as gas, electricity, oil, coal, chilled water, heated water and steam, but not water as a stand-alone utility. For example, if EUI is being used, the very best zone receives an EUI value of 0.0 and the very worst zone received an EUI value 200. Then, the color green is assigned to the EUI value of 0.0 and the color red is assigned to the EUI value of 200. Values in-between would be of a color which is partially green and partially red, preferably along a linear scale. For an EUI of 100, the color may be displayed as one-half green and one-half red. In some embodiments, the color for an EUI of 100 could be displayed in an area by displaying one-half pixels in red and one-half pixels in green for the area.

Another feature is that the circle 16 representing consumption is broken into sectors 18, 20 and 22 to represent components of consumption according to consumption types, similar to a pie-chart. For example, the first sector 18 is shown representing electricity consumption for a selected zone represented by the graphic form 16. The second sector 20 represents gas consumption for the selected zone. The third sector 22 represents water consumption for the selected zone. A second feature is that the type of consumption displayed may be filtered to exclude from display various consumption types so that only desired types of consumption are displayed. For example, gas and water consumption may be filtered so that only electricity consumption is displayed. A "data tip" 24 pops up when mouse scrolls over a particular section of a radar image pattern to show particular consumption data in a tabular display listing particulars of the consumption for the highlighted utility of sector for a particular zone shown.

Figure 2:
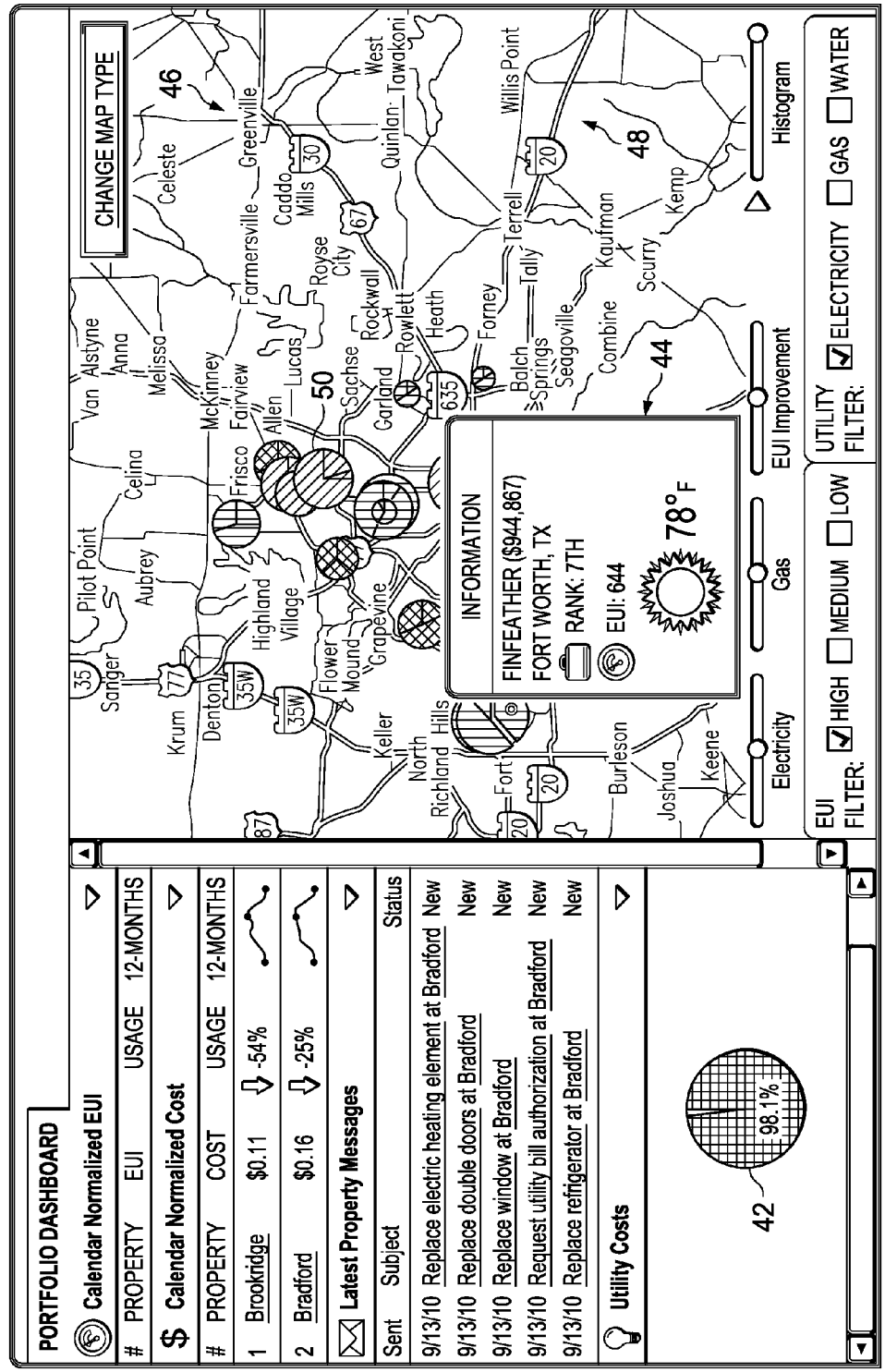

FIG. 2 is a screen shot representing a property view of utility consumption of local properties within a single region of the national real estate property portfolio of FIG. 1. A zoom feature has been used to change the field of view 46 shown in FIG. 2 to a local region 48, shown as the Dallas-Forth Worth, Tex. metropolitan area. The display area 46 and zone range has been redefined such that the geometric form 50 representing zones shows energy consumption for individual properties in a portfolio. Usage data for the local region 47 is shown in a tabular representation labeled "Portfolio Dashboard" on the left side of FIG. 2, providing measurements of key metrics associated with properties in the display area 46. A graphic shape 42 representing a pie chart also display total aggregate consumption for the display area 46 according to consumption type. The property data of FIG. 2 also provides a data tip 44 that pops up when a user's mouse scrolls over a particular sector of a graphic form 50 to provide a tabular display listing particulars of the consumption for a selected utility for a particular zone of an individual property.

Figure 3:
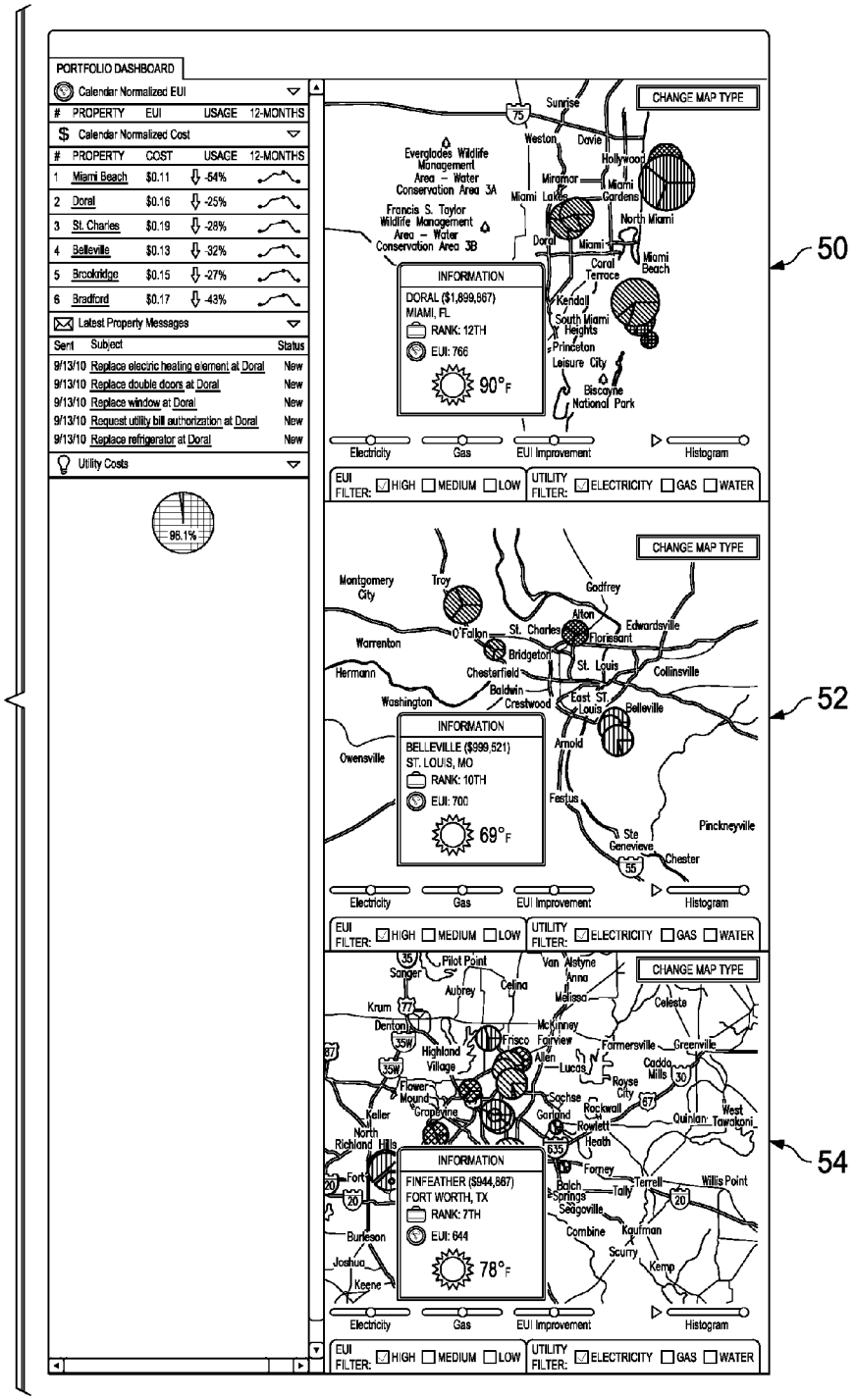

FIG. 3 is a screen shot showing multiple views 50, 52 and 54 of different property regions selected for display on the same screen, allowing direct comparison of consumption for properties in different geographic areas. Regional view 50 shows properties in the Miami, Fla. geographic area. Regional view 52 shows properties in the St. Louis, Mo. geographic area. Regional view 54 shows properties in the Dallas-Fort, Worth area. The Dashboard, on the left side of the views, is combined to list properties and associated metrics for all three of the displayed geographic regions.

Figure 4:
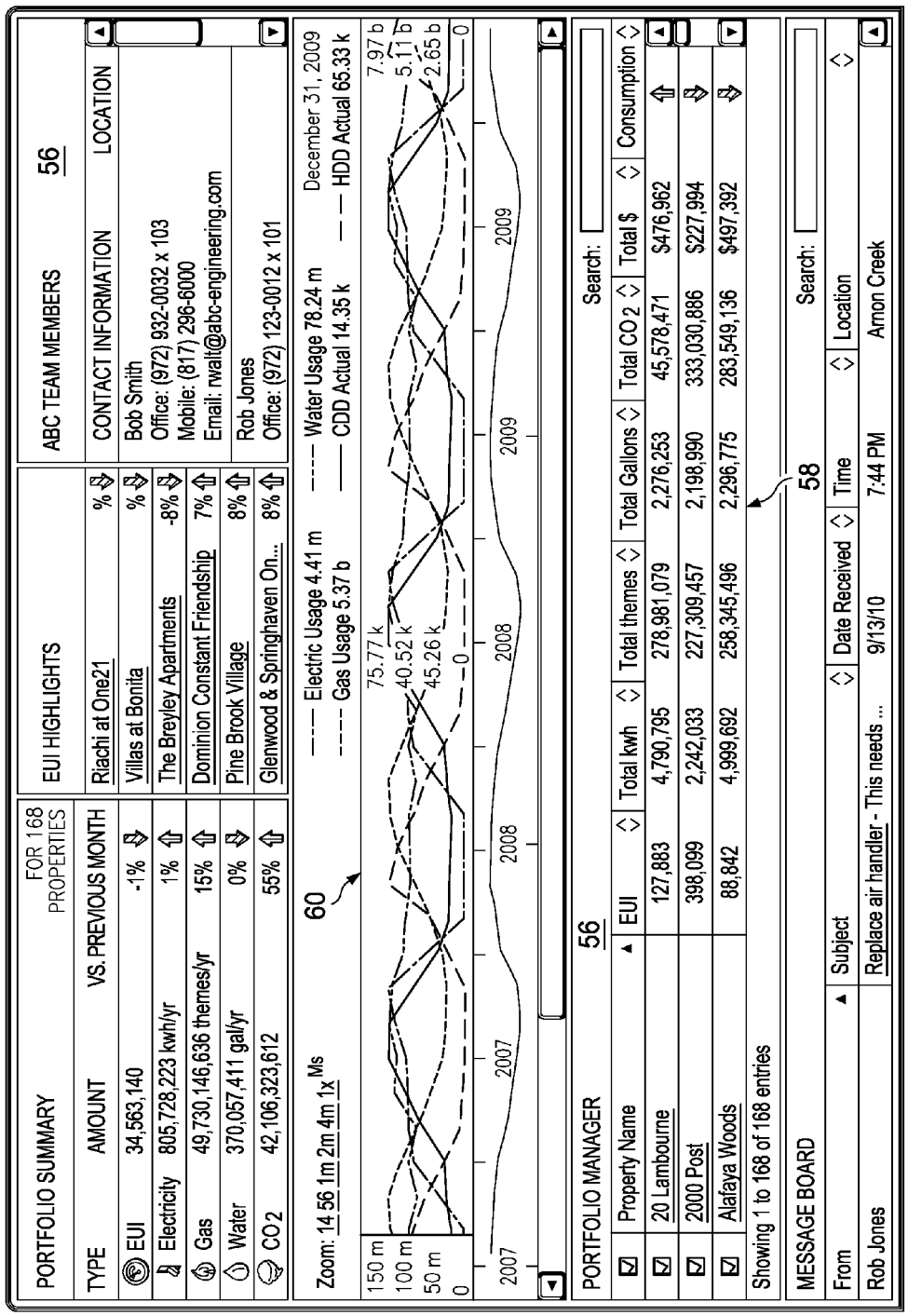

FIG. 4 is a screen shot illustrating combined tabular and graphic display of utility usage for a portfolio, with data for the usage shown in both tabular forms 56 and 58, and in a graphic form 60.

Figure 5:
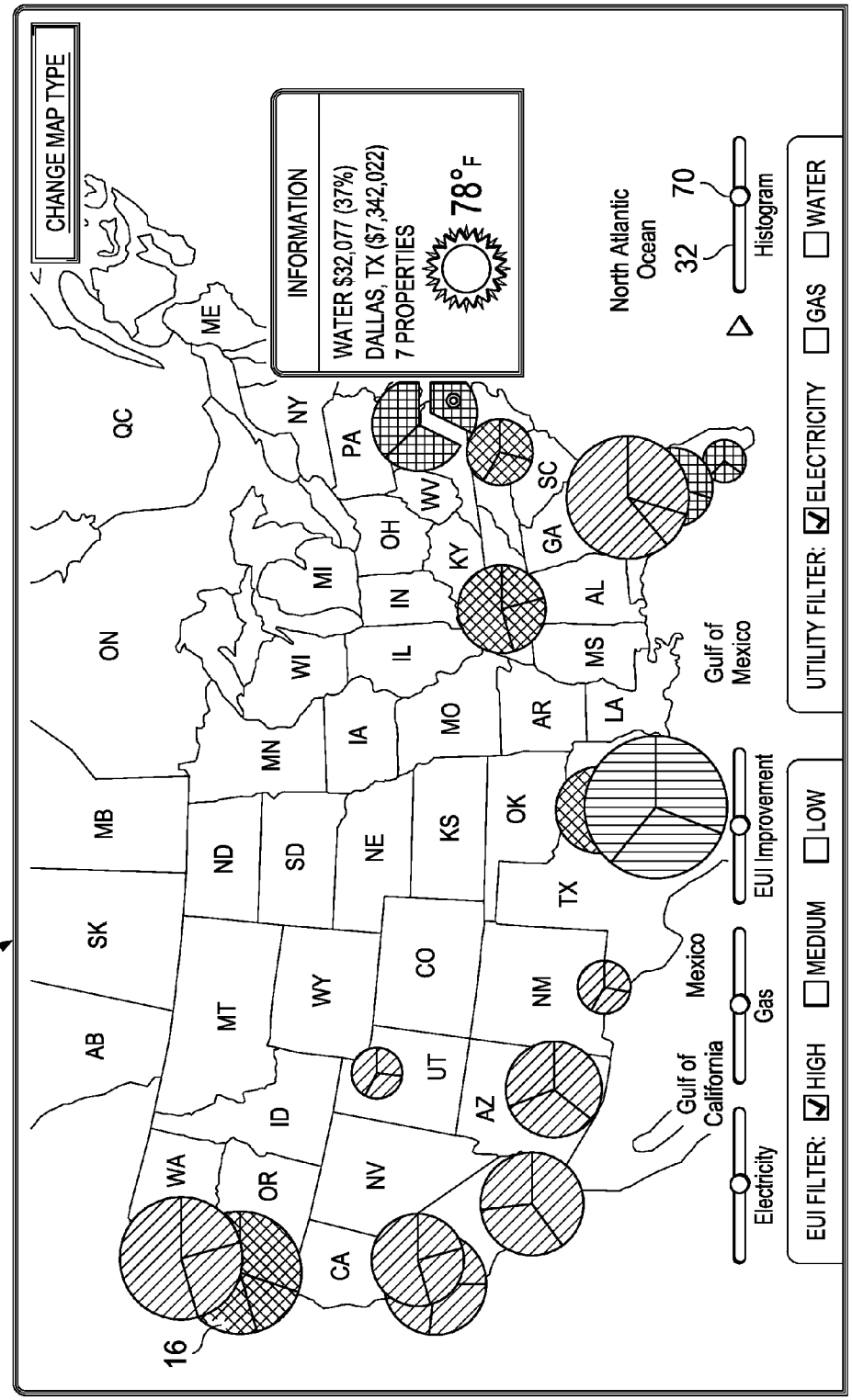

FIG. 5 is a screen shot illustrating graphic display 68 of the national real estate property portfolio with application of a change in a parameter. In comparison of FIG. 5 to FIG. 1, the histogram slider control 32 has been operated to move the set point 70 (shown in FIG. 5) from the far right, as shown in FIG. 1, toward a central location portion of the histogram slider control 32. This changes the time periods viewed for energy consumption from that shown in the time period represented in FIG. 1, to an earlier time period represented in FIG. 5. This may be used for viewing changes in consumption due to different periods of time as a static display or the slider moved continuously to display changing time periods in a manual automation. An automated feature is also provided for automatic display of different time periods, as discussed for step 158 of FIG. 8 and step 198 of FIG. 9.

The slider feature may also provide a graphic display of the impact of changes in utility rates and the impact of changes to energy consumption performance. The impact is shown on the display map by increasing or decreasing the displayed sizes and colors of the geometric forms 16 representing utility consumption for each zone. Changes in utility rates are expressed in dollars per unit of the particular utility. Changes in energy consumption performance are preferably expressed in terms Energy Use Intensity ("EUI") or in terms of Energy Cost Intensity ("ECI"). As show in the accompanying figures, slider controls 26, 28, 30 and 32 are shown in the lower portions of the views of FIGS. 1, 2 and 5. A neutral position is preferably a center position for each respective slider control, as shown in FIG. 1, and represents the current costs for each utility. The right side and the left side of each of the slider controls 26, 28, 30 and 32 represent increments of increased and decreased costs, consumption intensity, or other variables. For example, in reference to FIG. 1, the slider control 26 for electricity has a left terminal end which represents a decrease in cost of $0.25 per kwh and a right terminal end which represents an increase in cost of $0.25 per kwh. Increments in-between a neutral position (centered as shown in FIG. 1) and the left and right positions represent incremental costs between respective positions, preferably on a linear scale. The slider control 30 labeled "EUI Improvement" may also be used to provide a graphic representation of changes in Energy Use Intensity, such as from implementation of energy efficiency measures.

Filter functions are also provided as shown in the lower portions of the views of FIGS. 1, 2 and 5. Filter 36 is provided by three buttons which allow filtering out properties by EUI, based on high, medium and low intensities. A filter 34 is also provided with three buttons for filtering out utilities for display. Filter 34 is shown as having buttons for electricity, gas and water. Properties may also be filtered according to type of property, such as residential buildings, office buildings, commercial buildings, warehouses, utility consumption intensity, utility type, and the like.

When a slider control is being used to show the impact of changes in utility rates, the changes affected by the slider controls are displayed by increasing or decreasing the radar areas shown on the display map, preferably in a linear relationship between the change in costs and the displayed size of the radar area, but in other embodiments changes in slider control positions may be shown in exponential relationships, or logarithmic relationships. When a slider control is being used to show the impact of changes in EUI, the changes affected by the slider controls are displayed by changes in the color of the radar areas shown on the display map, preferably in an exponential relationship between the slider control and the displayed color of the radar area. All changes and usage results may also be displayed in a tabular form to allow a user to review the corresponding values for the changes made by the slider controls.

Figure 6:
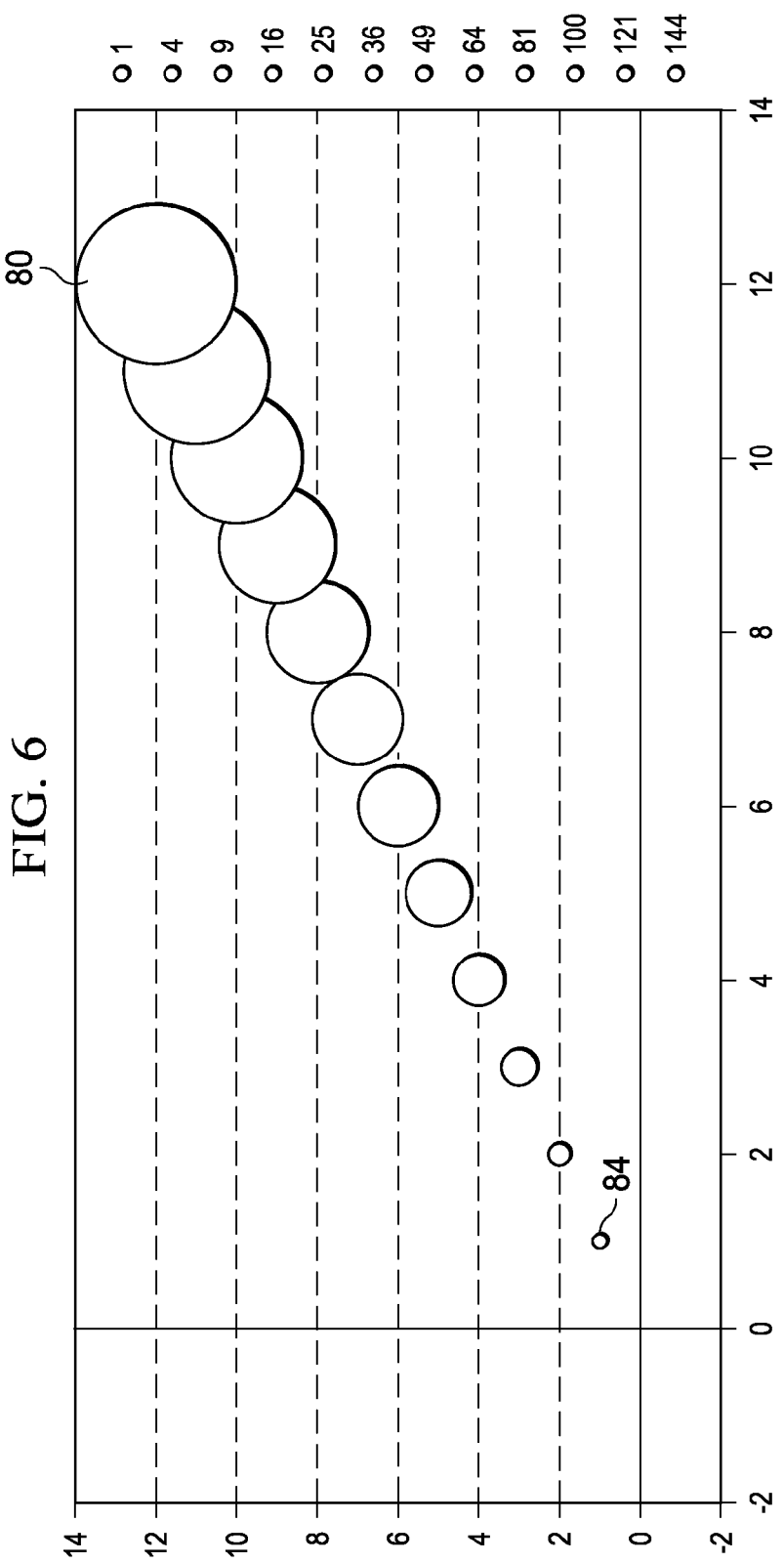

FIG. 6 is a graph representing various sizes circles used for the geometric forms providing "radar sweep" profiles. The display diameter representing consumption for a zone is determined by correlating the zone having the maximum consumption with a circle 80 having the largest display diameter and correlating the zone having the minimum consumption with the circle 84 having the smallest display diameter, and then interpolating there-between for zones of varying consumption. In some embodiments, the minimum value and the maximum value may be arbitrarily assigned to a particular value, such as $50,000 will be represented by a three-quarter inch circle 80. The value of consumption represented will be displayed as an area, so that small values will be readily visible for values of consumption over a broader range than if a linear scaling was used as opposed to an exponential scaling provided by displaying a mathematical "square" of the value by means of displaying an area ($X^2$ for area of a circle). The size of each radar zone displayed is a function of the overall consumption, or aggregate consumption, within each zone being displayed. A zone may be a city, geographic region in a state, a single property, a single building on a property, or components of a building.

In the graph of FIG. 6, the legend on the graph represents area, preferably squared units of measure such as $in^2$, $m^2$, or $pixels^2$. Preferably, aggregated energy consumption is expressed either in terms of BTU's or dollars. The largest circle 80 represents 144.0 times the contents of the smallest circle 84, yet both are visible without the larger circle 80 appearing so much larger than the smallest circle 84 that the smallest circle 84 becomes obscure to an observer. With this approach, even the smallest of properties or regions with a few properties are of a large enough area to be clearly visible to an observer without being dwarfed by the properties having the largest consumption.

Figure 7:
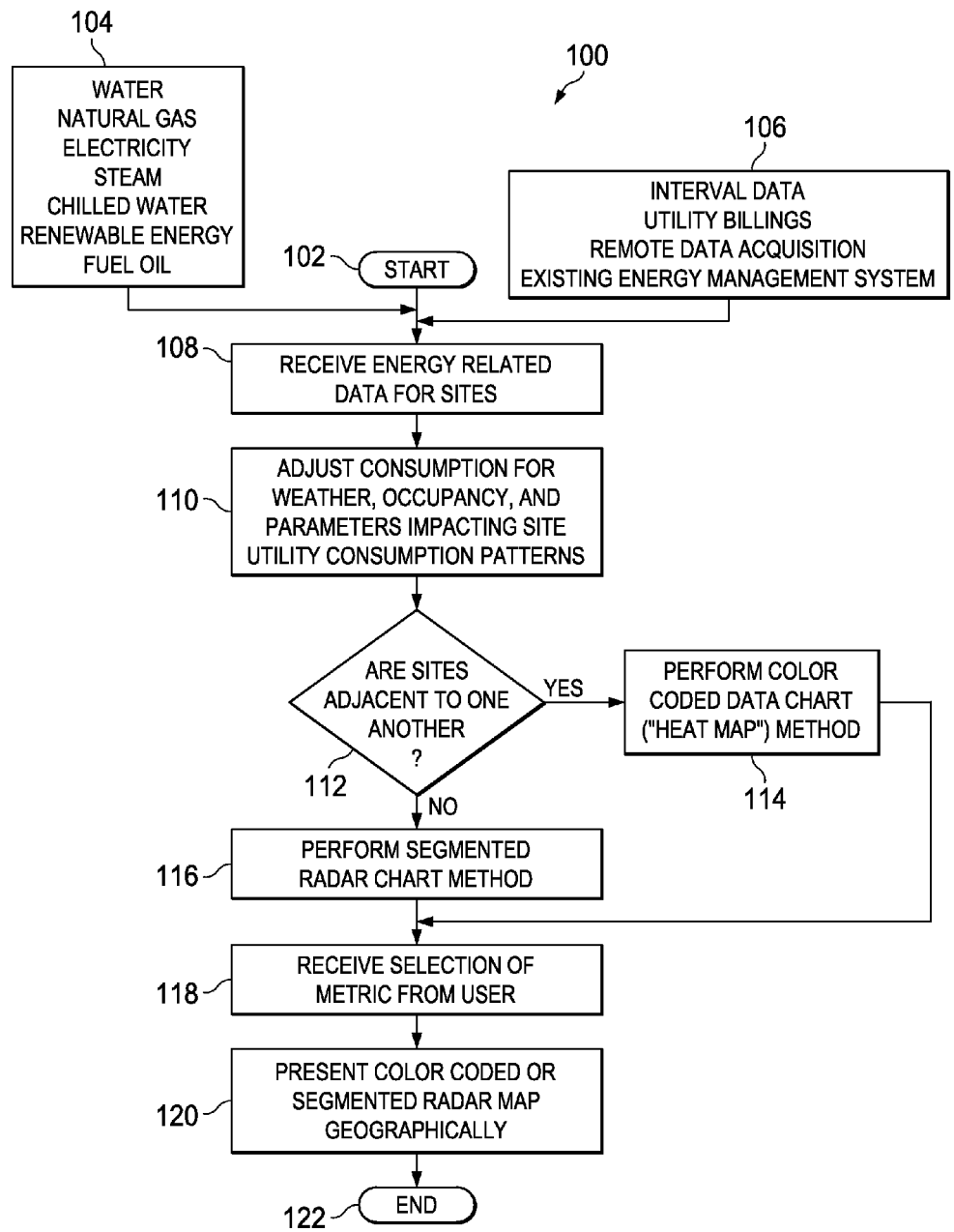

FIG. 7 is a flow chart showing a process 100 for monitoring and displaying utility consumption according to the present invention. The process 100 begins with a start step 102, and proceeds to a step 108 in which the various types of utility use information is collected and received form consumption data collected in steps 104 and 106. In step 110 the data is adjusted for factors affecting consumption, such as occupancy, weather, and the like. In step 112 a determination is made whether the particular sites being reviewed are adjacent, if so, the process proceeds to step 114 for use of a color coded data chart, or heat map, for analysis, according to the process shown in the flowchart of FIG. 9 and depicted by the heat map of FIG. 10. If in step 112 it is determined that the sites being reviewed are not adjacent, the process will proceed to step 116 and combine the utility data into a display with the various utilities segmented into different portions, according to the process show in the flowchart of FIG. 8 and radar type maps of FIGS. 1, 2, 3 and 5. In step 118 a metric selection for display is received from a user. In step 120 a color coded map or a segmented radar is presented according to the present invention. The process 100 ends with step 122.

Figure 8:
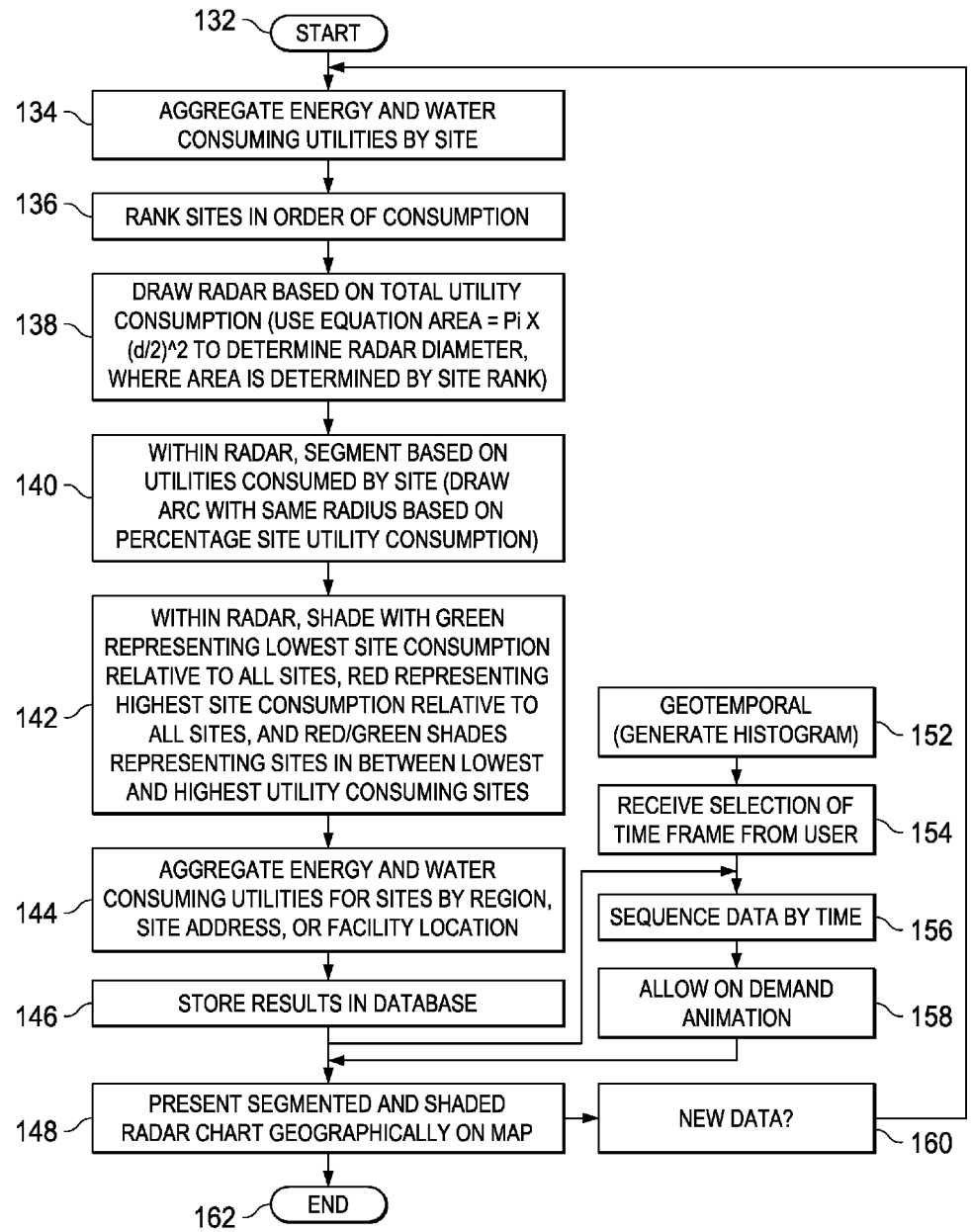

FIG. 8 is a flow chart showing the process for monitoring and displaying utility consumption as shown in FIGS. 1, 2, 3 and 5. The process begins with the start step 132, and then proceeds to step 134 in which energy and water utilities are aggregated by site, or zone. In step 136 the various sites, or zones, are ranked in order of consumption. In step 138 the ranking of zones is used to determine the areas of geometric forms which will be used for display of utility consumption. In step 140 the geometric forms are partitioned into segments to represent the various types of utilities being consumed, according to percentage of consumption corresponding to each. In step 142 a determination of color is made by ranking zones according to consumption intensity. In step 144 utility consumption is aggregated by region, or display area, and then the information is stored in a database in step 146. In steps 152, 154, 156 and 158 selections are made by a user, then processed and displayed showing changes of zone circle size and color over time. In step 152 a user selects a geotemporal display, and then selects a time frame in step 154. In step 156 the data selected is sequenced by date and time, and display as an animated feature is allowed in step 158, rather than as a static temporal display by operating the slider control 32. The process proceeds to step 148 and the display is presented. In step 160 inputs are monitored to determine whether new data is currently available. The process ends in step 162.

Figure 9:
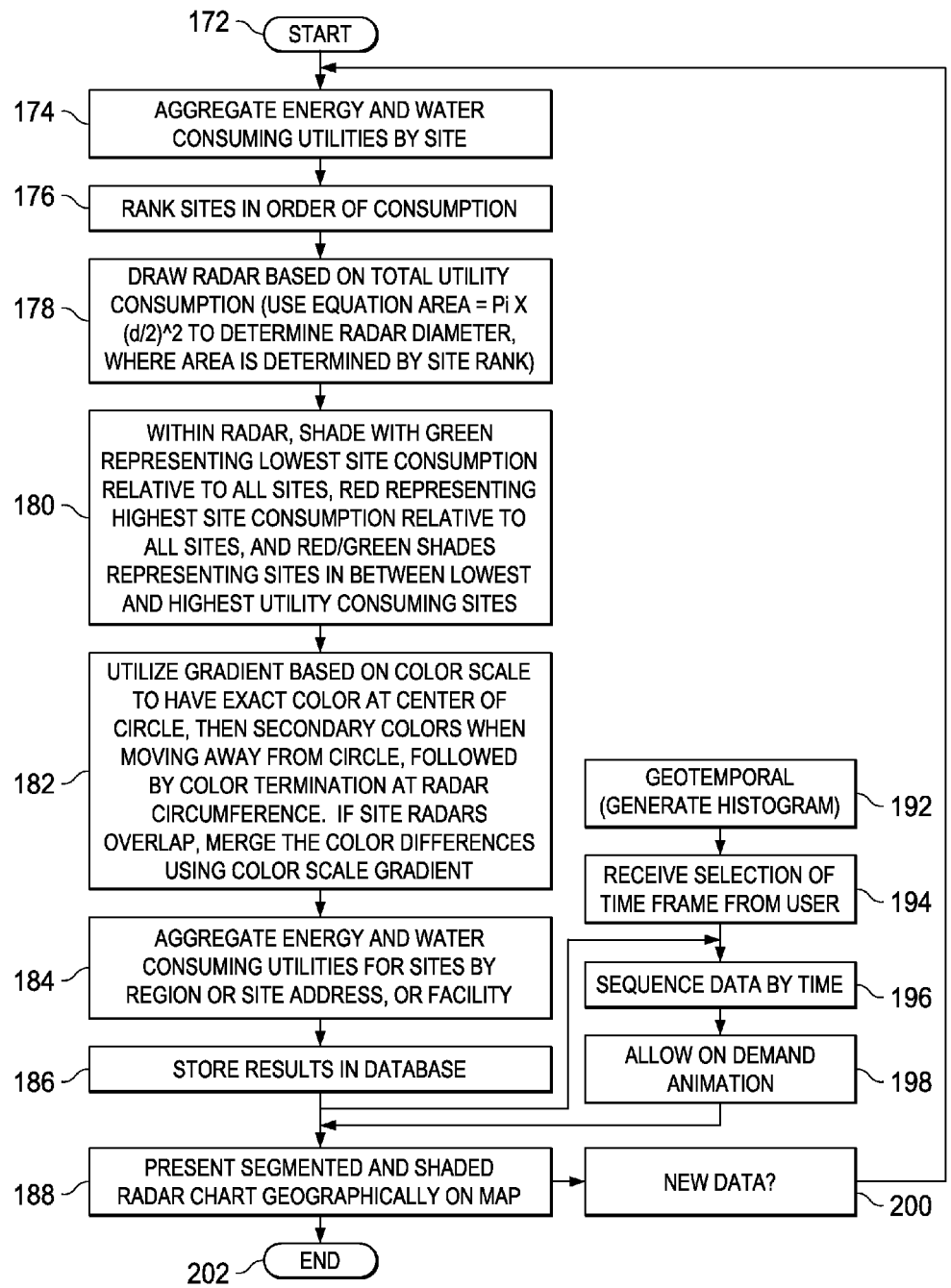
Figure 10:
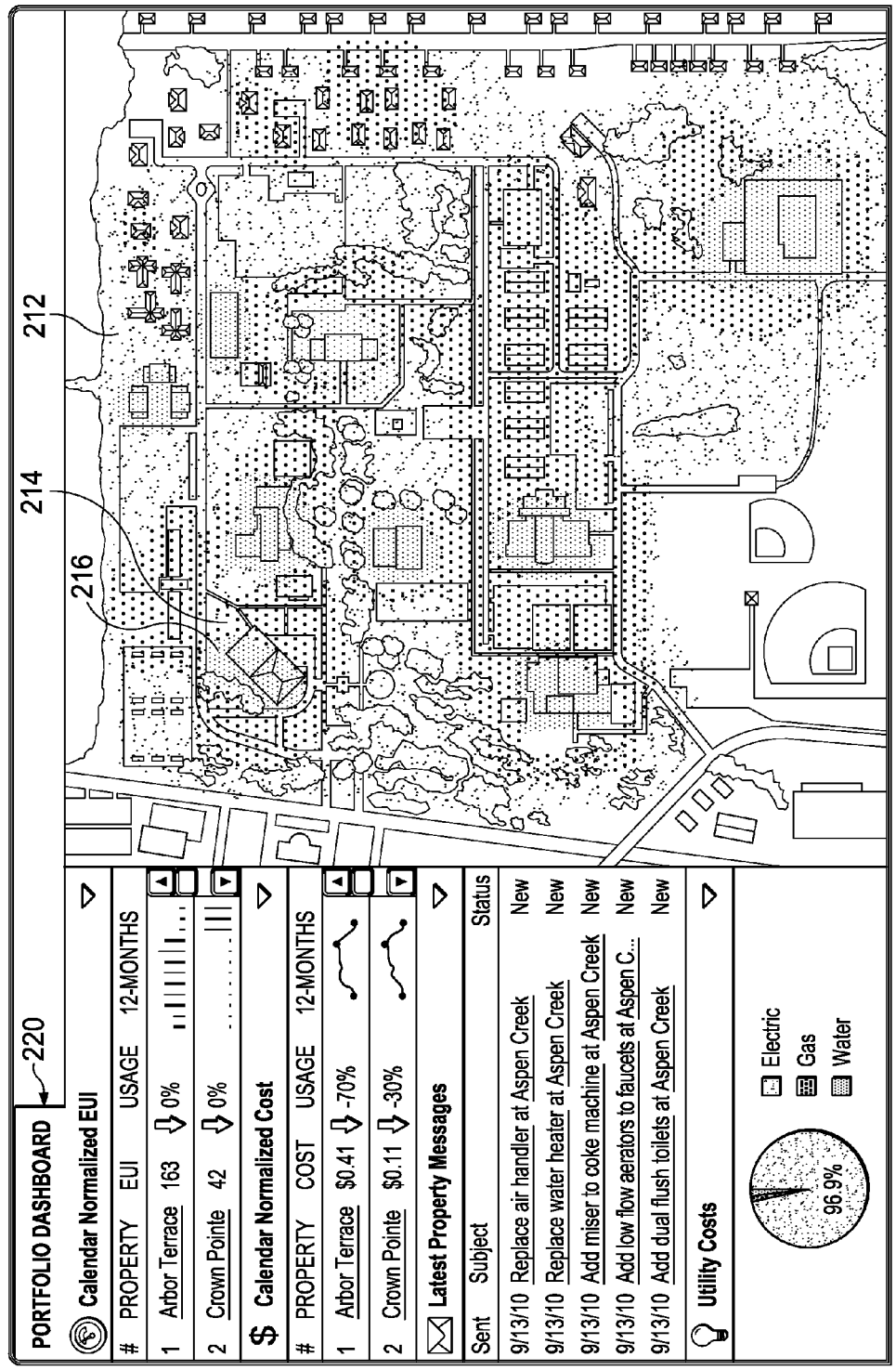
FIG. 10 is a color coded map representing energy usage according to a second embodiment of the present invention.

FIG. 9 is a flow chart showing the process for monitoring and displaying utility consumption according to FIG. 10. The process begins with the start step 172, and then proceeds to step 174 in which energy and water utilities are aggregated by zone. In step 176 the various zones are ranked in order of consumption. In step 178 the ranking of zones is used to determine the areas of geometric forms which will be used for display of utility consumption. In step 180 the radar is color coded according to relative consumption intensities values for each particular zone. In step 182 a gradient is used for combining colors, with an exact color used at the center of a circle representing a zone, secondary colors used when moving away from the center of the circle, and the color fully terminated at the circumferential periphery of the circle. If circles overlap, the colors can be merged using a color scale gradient, by mixing pixels of different color in an overlap portion. In step 184 utility consumption is aggregated by region, or display area, and then the information is stored in a database in step 186. In steps 192, 194, 196 and 198 selections are made by a user then processed and displayed showing changes over time. In step 192 a user selects a geotemporal display, and then selects a time frame in step 194. In step 196 the data selected is sequenced by date and time, and display as an animated feature is allowed in step 198. The process proceeds to step 188 and the display is presented. In step 200 inputs are monitored to determine whether new data is currently available. The process ends with step 202.

FIG. 10 is a color coded map representing consumption according to a second embodiment of the present invention, which is also referred to as a "heat map," although use of other utilities other than consumed energy utilities may be displayed. This type display is used when properties are adjacent and direct comparisons of properties may be beneficial rather than aggregating into regional zones. In the display area 212, color coding green geometric forms and red geometric forms located proximate to buildings are used to indicate consumption. Similar to FIGS. 1, 2, 3 and 5, the geometric forms are preferably shaped as circles. As with the circular representation of zones represented as radar sweeps in FIGS. 1, 2, 3 and 5, the size indicates total consumption and the color represents intensity of consumption. Color regions 214 and 216 represent varying values for consumption for the different zones displayed, with the zones preferably displayed as buildings as shown in FIG. 10. A gradient is used for combining colors for different green and red colored regions, with an exact color used at the center of region representing a zone, secondary colors used when moving away from the center of the zone, and the color fully terminated at a periphery of the region. If regions overlap, the colors are shown as merged using a color scale gradient, such as intermixing pixels of different colors in small areas. Secondary colors result from intermixing pixel colors of red and green. Data is shown in tabular form on the table 220.

It should be noted that the method for graphic display disclosed herein is used in a data processing system, as part of software for displaying such parameters. As such, consumption data is stored in memory and retrieved from memory for processing to determine the size and color of graphic forms used for display of energy consumption, such as in FIGS. 1, 2, 3 and 5, and for the color coded, heat map display of FIG. 10.

The present invention provides advantages of a graphic display of total consumption for properties in a real estate property portfolio, preferably on a map of a selected geographic area. The graphic display may be provided for a zone defined as having national scope with properties of various metropolitan areas grouped for singular display. The graphic display may also be provided with a zone defined as a local market, various properties displayed, and component portions of a building. The graphic display zones may also be defined for a singular property and individual buildings or units displayed, provided utility usage is tracked for individual buildings or units. Slider controls are also provided for adjusting the graphic display for different time periods using the histogram control, for changes in costs per unit of a particular utility, and for changes in Energy Use Intensity. The total utility consumption for each zone in a selected display area is graphically represented by the size of displayed circles, with zones of larger consumption having display area which are larger in size than zones of less utility consumption. Additionally, the ECI or EUI is displayed as a fill color for each circle representing a zone, preferably linearly scaled such that the zone of smaller consumption is the color green, the zone of most consumption is dark red, and other colors are linearly correlated to colors ranging from green to red.

Although the preferred embodiment has been described in detail, it should be understood that various changes, substitutions and alterations can be made therein without departing from the spirit and scope of the invention as defined by the appended claims.

What is claimed is:

1. A method for monitoring and displaying relative utility consumption for different properties in a real estate portfolio implemented in software operating a data processing system, the method comprising the steps of:

providing the data processing system and the software, the data processing system having memory in which data for utility consumption of the different properties in the real estate portfolio is stored, and the software is operable in data processing system for performing all of the following steps;

receiving selection of a display area, temporal period, and display zones for display of utility consumption for the zones within the display area, wherein the zones are selected to represent one or more of the different properties;

determining values of total utility consumption and consumption intensities for the different properties in the real estate portfolio, wherein first and second values are calculated for each zone, with the first values corresponding to total aggregate utility consumption of each of the zones and the second values corresponding to consumption intensity for each of the zones;

ranking the first values for each zone from high to low and associating each of the first values with a size of a geometric form corresponding to each of the zones, wherein a highest of the first values has a largest size, the smallest of the first values has the smallest size, and the remaining of the first values are associated with sizes, from high to low, corresponding to an associated total utility consumption ranking;

ranking the second values for each zone from high to low and associating each of the second values with a corresponding color for the respective geometric form for each of the zones, wherein a highest of the second values has a first color representing a highest consumption intensity, the smallest of the second values has a second color representing the lowest consumption intensity, and the remaining of the second values are associated with mixtures of the first color and the second color, and color shades there-between, corresponding to an associated consumption intensity ranking; and displaying on a map of the display area the respective geometric form for each of the zones, wherein each of the geometric forms having the associated size determined from the ranking of corresponding first values for each of the zones and the color associated with respective ones of the second values for each of the zones, and wherein the geometric forms corresponding to each of the zones are shown disposed at respective spatial locations on the map.

2. The method according to claim 1, wherein associating each of the first values with the size of the geometric form corresponding to each of the zones is determined by one of a first linear scaling and a first exponential scaling; and wherein the association of the second values with the first color and the second color is determined by one of a second linear scaling and a second exponential scaling.

3. The method according to claim 1, further comprising the step of selecting the geometric forms for each of the zones to be a circle representative of a radar sweep.

4. The method according to claim 1, wherein the geometric forms corresponding to each of the zones are partitioned into sectors which graphically represent respective ones of types of utility components for the total utility consumption of each of the zones.

5. The method according to claim 4, wherein the relative sizes of the sectors for each of the zones is determined by relative consumption values of respective utility consumption.

6. The method according to claim 5, wherein the relative consumption values of respective utility consumption are determined according to one of units of energy consumed and costs for the utilities consumed.

7. The method according to claim 4, wherein virtually pointing to one of the sectors provides a tabular display listing particulars of the utility consumption represented by the one of the sectors.

8. The method according to claim 1, wherein the zones correspond to one of regional geographic locations, local geographic locations, townships, contiguous properties in a selected locale, buildings in a selected property, and portions of a selected building; and wherein said display area corresponds to one of a continent, a nation, a regional geographic location, a local geographic location, a township, a selected locale, a contiguous property, and a building.

9. The method according to claim 8, wherein the display area may be zoomed from displaying a full view of the display area, to a selected portion of the display area, and to a selected one of the zones, wherein when zoomed to the selected one of the zones the properties comprising the selected one of the zones are displayed as newly defined zones.

10. The method according to claim 9, wherein the full view of the display area is viewed simultaneously with the selected portion of the display area and with the selected zone; and wherein types of utility consumption may be selectively filtered to display only at least one selected utility.

11. The method according to claim 1, wherein at least one slider control is displayed and may be operated to change the relative values for the utility consumption and the energy intensity in the display area, such that the sizes and the colors for the geometric forms are adjusted to display the effect of the changes.

12. A method for monitoring and displaying utility consumption for different properties in a real estate portfolio implemented in software operating a data processing system, the method comprising the steps of:

providing the data processing system and the software, the data processing system having memory in which data for utility consumption of the properties in the real estate portfolio is stored, and the software is operable in data processing system for performing all of the following steps;

receiving a display area, temporal period, and display zones for display of utility consumption for the zones within the display area, wherein the zones are selected to represent one or more of the properties;

determining values of total utility consumption and consumption intensities for the properties in the real estate portfolio, wherein first and second values are calculated for each zone, with the first values corresponding to total aggregate utility consumption of each of the zones and the second values corresponding to consumption intensity for each of the zones;

ranking the first values for each zone from high to low and associating each of the first values with a size of a geometric form corresponding to each of the zones, wherein a highest of the first values has a largest size, the smallest of the first values has the smallest size, and the remaining of the first values are associated with sizes, from high to low, corresponding to an associated total utility consumption ranking;

ranking the second values for each zone from high to low and associating each of the second values with a corresponding color for the respective geometric form for each of the zones, wherein a highest of the second values has a first color representing a highest consumption intensity, the smallest of the second values has a second color representing the lowest consumption intensity, and the remaining of the second values are associated with mixtures of the first color and the second color, and color shades there-between, corresponding to an associated consumption intensity ranking;

displaying on a map of the display area the respective geometric form for each of the zones, wherein each of the geometric forms having the associated size determined from the ranking of corresponding first values for each of the zones and the color associated with respective ones of the second values for each of the zones, and wherein the geometric forms corresponding to each of the zones are shown disposed at respective spatial locations on the map; and wherein the geometric forms corresponding to each of the zones are partitioned into sectors which graphically represent respective ones of types of utility components for the total utility consumption of each of the zones.

13. The method according to claim 12, wherein the relative sizes of the sectors for each of the zones is determined by relative consumption values of respective utility consumption; and wherein the relative consumption values of respective utility consumption are determined according to one of units of energy consumed and cost for the utilities consumed.

14. The method according to claim 13, further comprising the step of selecting the geometric forms for each of the zones to be a circle.

15. The method according to claim 14, wherein virtually pointing to one of the sectors provides a tabular display listing particulars of the utility consumption represented by the one of the sectors.

16. The method according to claim 15, wherein the zones correspond to one of regional geographic locations, local geographic locations, townships, contiguous properties in a selected locale, buildings in a selected property, and portions of a selected building; and wherein said display area corresponds to one of a continent, a nation, a regional geographic location, a local geographic location, a township, a selected locale, a contiguous property, and a building.

17. The method according to claim 16, wherein the display area may be zoomed from displaying a full view of the display area, to a selected portion of the display area, and to a selected one of the zones, wherein when zoomed to the selected one of the zones the properties comprising the selected one of the zones are displayed as newly defined zones;

wherein the full view of the display area may be viewed simultaneously with the selected portion of the display area and with the selected zone, and wherein types of utility consumption may be selectively filtered to display only at least one selected utility.

18. The method according to claim 17, wherein at least one slider control is displayed and may be operated to change the relative values for the utility consumption and the energy intensity in the display area, such that the sizes and the colors for the geometric forms are adjusted to display the effect of the changes.

19. A method for monitoring and displaying utility consumption for different properties in a real estate portfolio implemented in software for operating a data processing system, the method comprising the steps of:

providing the data processing system and the software, the data processing system having memory in which data for utility consumption of the properties in the real estate portfolio is stored, and the software is operable in data processing system for performing all of the following steps;

receiving into the data processing system a selection of a display area, a temporal period, and display zones for display of utility consumption for the zones within the display area, and storing the selection in the memory, wherein the zones are selected to represent one or more of the properties;

collecting and storing in the memory values for utility consumption of the properties in the real estate portfolio;

determining values of total utility consumption and consumption intensities for the properties in the real estate portfolio from the values for utility consumption stored in the memory and storing the determined values in the memory, wherein first and second values are calculated for each zone, with the first values corresponding to total aggregate utility consumption of each of the zones and the second values corresponding to consumption intensity for each of the zones;

comparing the first values stored in memory and assigning a first ranking stored in memory with the first ranking associated with the first values stored, wherein the first values for each zone are ranked from high to low and associated with each of the first values is a size of a geometric form corresponding to each of the zones, wherein a highest of the first values has a largest size, the smallest of the first values has the smallest size, and the remaining of the first values are associated with sizes, from high to low, corresponding to an associated total utility consumption ranking;

comparing the second values stored in memory and storing in memory a second ranking of the second values for each zone from high to low and associating each of the second values with a corresponding color for the respective geometric form for each of the zones, wherein a highest of the second values has a first color representing a highest consumption intensity, the smallest of the second values has a second color representing the lowest consumption intensity, and the remaining of the second values are associated with mixtures of the first color and the second color, and color shades there-between, corresponding to an associated consumption intensity ranking stored in memory; and recalling the stored sizes and colors of the respective geographic forms from memory, and displaying on a map of the display area the respective geometric forms for each of the zones, with each of the geometric forms having the associated size determined from the ranking of corresponding first values for each of the zones and the color associated with respective ones of the second values for each of the zones, and wherein the geometric forms corresponding to each of the zones are shown disposed at respective spatial locations on the map;

wherein the display area may be zoomed from displaying a full view of the display area, to a selected portion of the display area, and to a selected one of the zones, wherein when zoomed to the selected one of the zones the properties comprising the selected one of the zones are displayed as newly defined zones; and providing at least one slider control, wherein said slider control is operated to process the stored consumption data which results in changes to the relative displayed values for the geometric forms correlating to changes in the utility consumption and the consumption intensity in the display area, such that the displayed sizes and the colors for the geometric forms are adjusted to display the effect of the changes.

20. The method according to claim 19, wherein the values in memory in the data processing system are processed to partition the geometric forms corresponding to each of the zones such that the resulting partitions graphically represent respective ones of types of utility components for the total utility consumption of each of the zones;
 wherein the relative sizes of the sectors for each of the zones is determined by relative consumption values of respective utility consumption; and
 wherein the relative consumption values of respective utility consumption are determined according to one of units of energy consumed and cost for the utilities consumed.

21. The method according to claim 19, wherein the at least one slider operates a histogram function to input time selection data into the data processing system to display stored consumption data and display the geometric forms representing utility consumption and consumption intensity for different time periods.

22. The method according to claim 19, wherein said data processing system has an automation feature to automatically display stored consumption data for utility consumption and consumption intensity for different time periods.

23. The method according to claim 19, wherein multiple geographic regions are displayed on a single screen for comparison purposes.

24. The method according to claim 19, wherein the display area are for contiguous properties which are separately displayed;
 wherein a gradient is used for combining colors, with an exact color used at the center of a circle representing a zone, secondary colors used when moving away from the center of the circle, and the color fully terminated at the circumferential periphery of the circle; and
 wherein the colors for overlap regions are merged using a color scale gradient, by mixing pixels of different color in an overlap portion.

* * * * *